US011691489B2

(12) United States Patent
Kumamoto et al.

(10) Patent No.: US 11,691,489 B2
(45) Date of Patent: Jul. 4, 2023

(54) VEHICLE DOOR STRUCTURE

(71) Applicant: MAZDA MOTOR CORPORATION, Hiroshima (JP)

(72) Inventors: Kazuya Kumamoto, Hiroshima (JP); Tomokazu Kitagawa, Hiroshima (JP); Takashi Ikemoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 134 days.

(21) Appl. No.: 17/421,459

(22) PCT Filed: Jan. 10, 2020

(86) PCT No.: PCT/JP2020/000701
§ 371 (c)(1),
(2) Date: Jul. 8, 2021

(87) PCT Pub. No.: WO2020/149237
PCT Pub. Date: Jul. 23, 2020

(65) Prior Publication Data
US 2022/0080815 A1 Mar. 17, 2022

(30) Foreign Application Priority Data

Jan. 15, 2019 (JP) .................................. 2019-004418

(51) Int. Cl.
*B60J 10/50* (2016.01)
*B60J 5/04* (2006.01)

(52) U.S. Cl.
CPC ............... *B60J 10/50* (2016.02); *B60J 5/048* (2013.01); *B60J 5/0426* (2013.01); *B60J 5/0429* (2013.01)

(58) Field of Classification Search
CPC .............................. B60J 5/0426; B60J 5/0429
(Continued)

(56) References Cited

U.S. PATENT DOCUMENTS 7,231,717 B2 * 6/2007 Wurm .................... B60J 5/0463
29/469
8,371,639 B2 * 2/2013 Danaj .................... B60J 5/0437
49/502
(Continued)

FOREIGN PATENT DOCUMENTS

JP H06-227360 A 8/1994
JP 2003-261070 A 9/2003
(Continued)

OTHER PUBLICATIONS

The extended European search report issued by the European Patent Office dated Jan. 17, 2022, which corresponds to European Patent Application No. 20741374.1-1015 and is related to U.S. Appl. No. 17/421,459.
(Continued)

*Primary Examiner* — Joseph D. Pape
(74) *Attorney, Agent, or Firm* — Studebaker & Brackett PC

(57) ABSTRACT

A door structure of a vehicle includes: an outer panel (4); an inner member (5, 11A) arranged on an inner side of the outer panel in a vehicle width direction; a rigid member (9) arranged between the inner member (5, 11A) and the outer panel (4); and a vibration suppression member (22) arranged between the outer panel (4) and the rigid member (9). The outer panel (4) includes a hem section (10*f*, 10*r*, 10*u*) disposed on a periphery thereof and connected to the inner member (5, 11A) by swaging. The vibration suppression member (22) includes a damping material (22A to 22C) located adjacent to the hem section (10*f*, 10*r*, 10*u*) and being in contact with the outer panel (4) and the rigid member (9).

18 Claims, 8 Drawing Sheets

(58) Field of Classification Search
USPC ........................................ 296/146.6
See application file for complete search history.

(56) References Cited

U.S. PATENT DOCUMENTS

| | | | |
|---|---|---|---|
| 8,960,768 B2 * | 2/2015 | Kato | B62D 25/04 |
| | | | 296/187.12 |
| 2005/0150720 A1 | 7/2005 | Tudor et al. | |
| 2007/0210612 A1 | 9/2007 | Kidachi et al. | |
| 2009/0026795 A1 * | 1/2009 | Tate | B60J 5/0429 |
| | | | 296/146.6 |

FOREIGN PATENT DOCUMENTS

| | | | |
|---|---|---|---|
| JP | 2006-151038 A | 6/2006 |
| JP | 2007-519556 A | 7/2007 |
| JP | 2007-269301 A | 10/2007 |
| JP | 2012-140057 A | 7/2012 |
| JP | 2012-140058 A | 7/2012 |
| JP | 2018-090061 A | 6/2018 |

OTHER PUBLICATIONS

International Search Report issued in PCT/JP2020/000701; dated Mar. 10, 2020.

\* cited by examiner

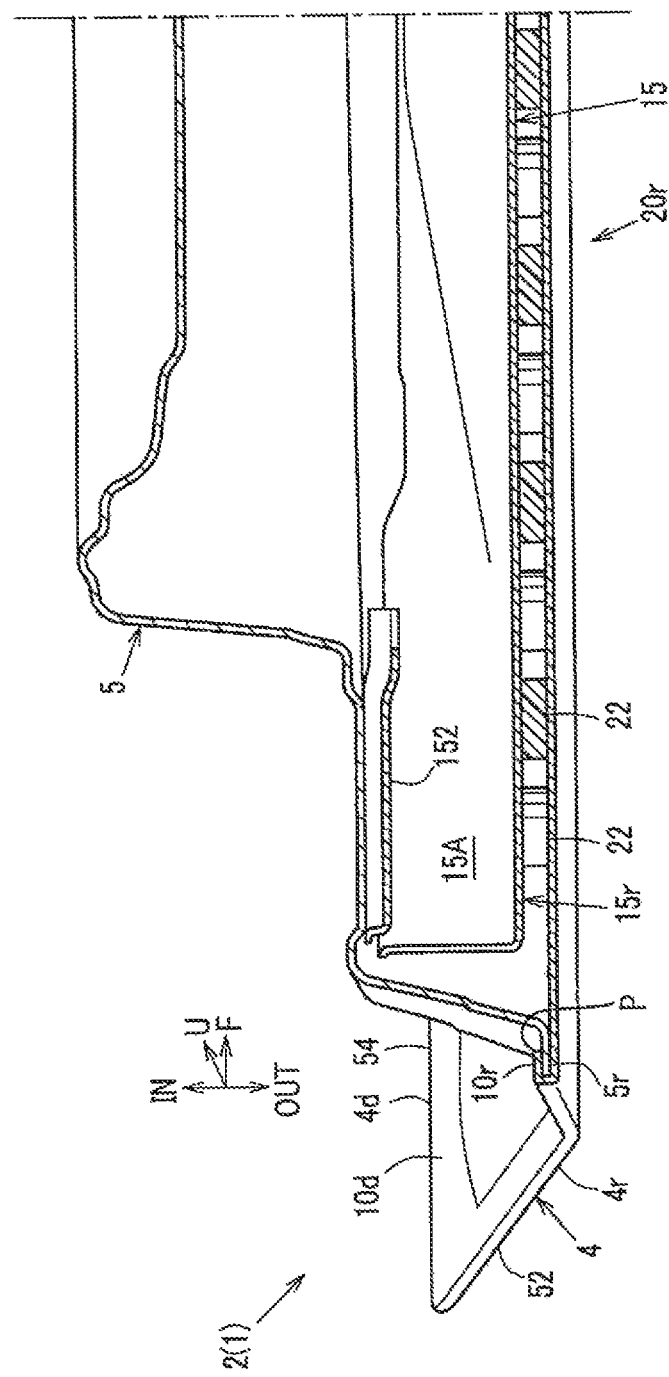

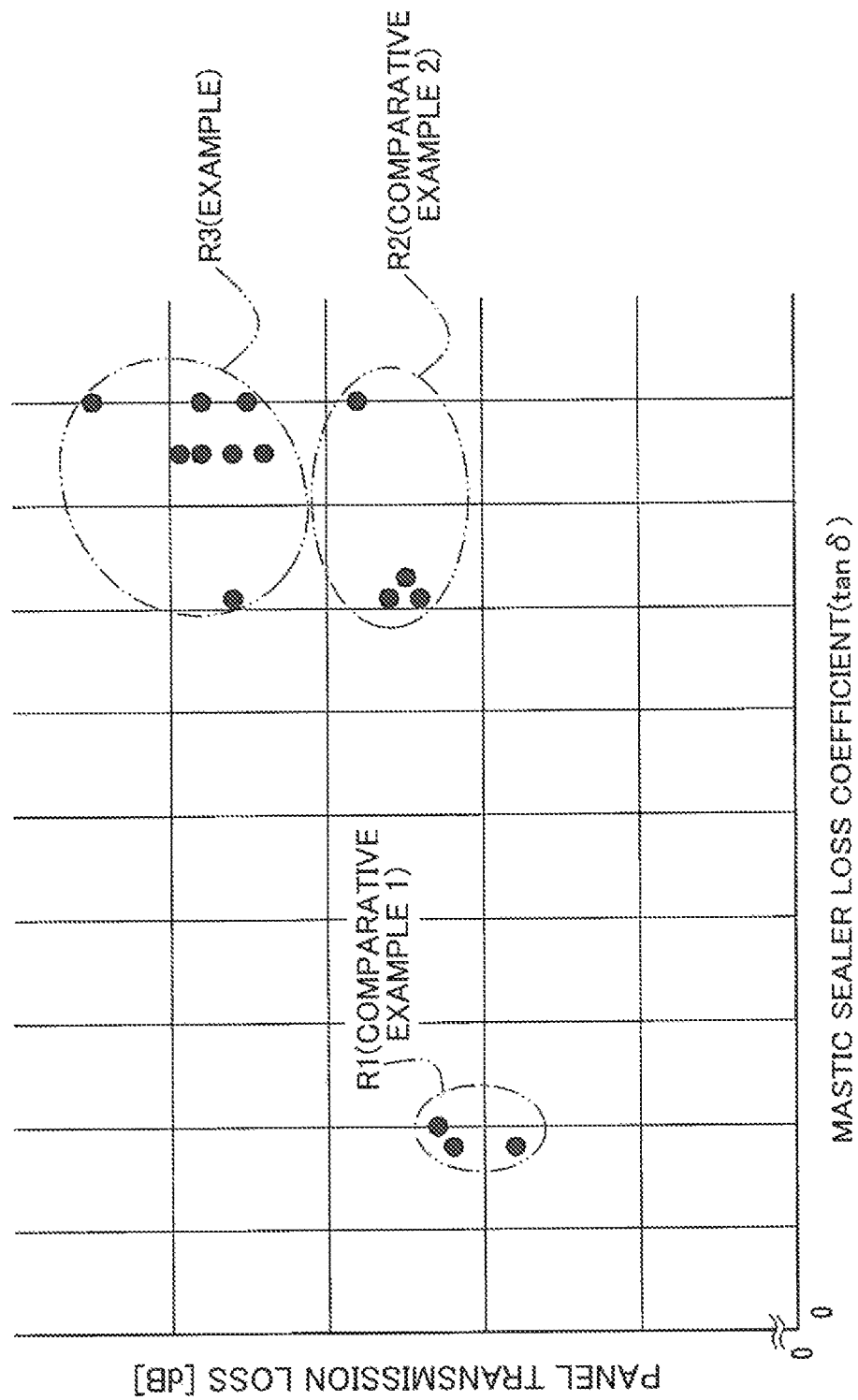

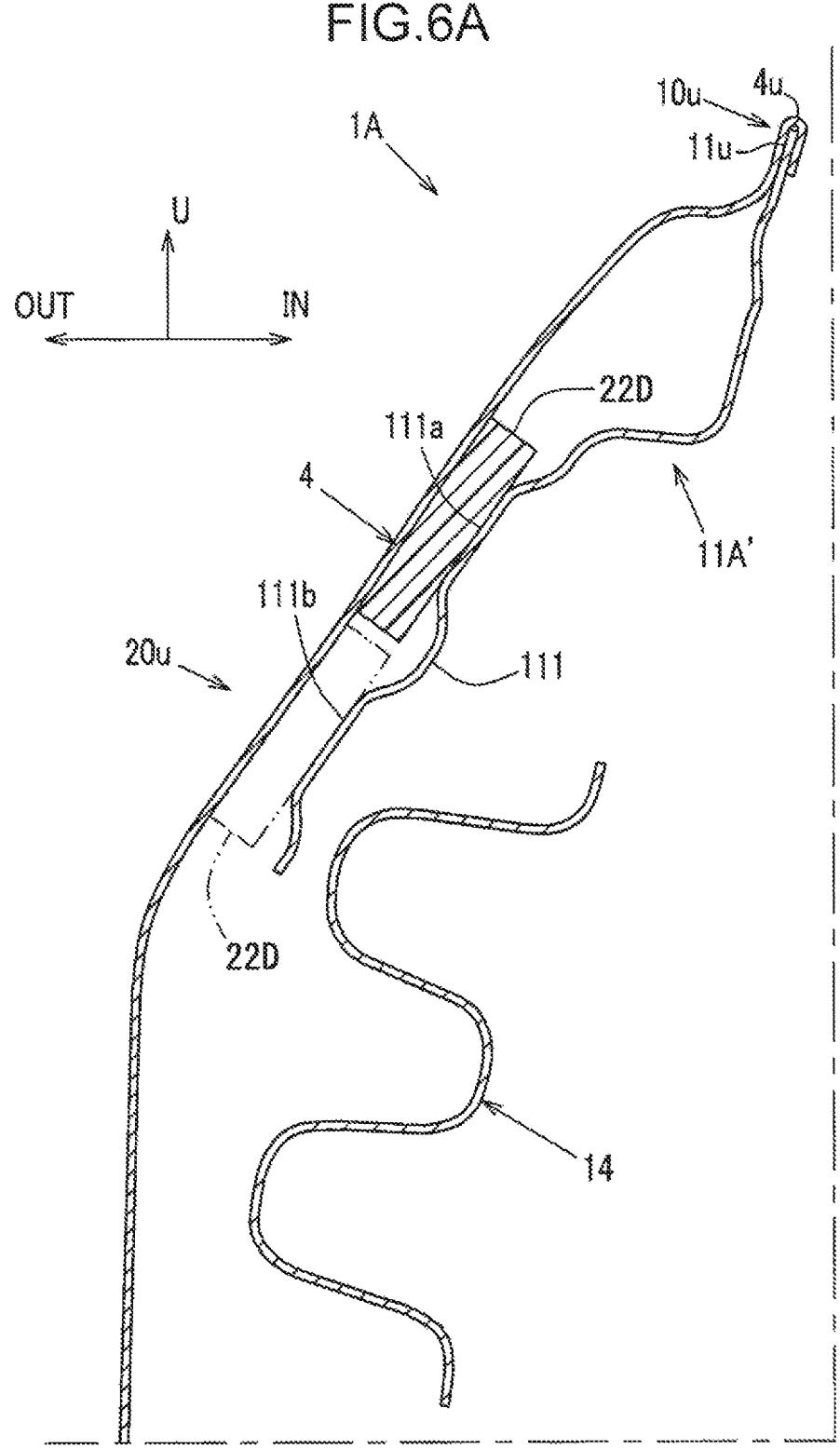

VEHICLE DOOR STRUCTURE

TECHNICAL FIELD

The present invention relates to a door structure of a vehicle including: an outer panel; an inner member arranged on an inner side of the outer panel in a vehicle width direction; and a rigid member arranged between the inner member and the outer panel.

BACKGROUND ART

During running of a vehicle, an excitation force caused by, for example, an engine sound, a tire sound, or a wind sound transmitted to a door via an air acts on an outer panel of the door from an outer side in a vehicle width direction. The outer panel of the door is typically a thin plate. Hence, the excitation force may cause the outer panel to vibrate, and a radiant sound attributed to the vibration may be accordingly emitted from the outer panel. The radiant sound from the outer panel is transmitted into a vehicle compartment as a noise. The same situation can occur when the door in an open state is closed.

Increasing the thickness of the outer panel can reduce the noise transmitted into the vehicle compartment due to the aforementioned mechanism. However, such an increase in the thickness of the outer panel is directly linked to an increase in the weight of the vehicle, which is unfavorable. Under the circumstances, techniques capable of suppressing the vibration without increasing the thickness of the outer panel have been demanded.

In contrast, it has been also known to provide a damping material in an inner part of a door, as disclosed in Patent Literature 1, for allowing an outer panel to have a panel rigidity.

Specifically, in Patent Literature 1, an adhesive serving as a damping material is provided between the outer panel and a door beam (door impact bar). The adhesive is arranged at a plurality of positions except a front end and a rear end of the outer panel (see, for example, FIG. 1A of Patent Literature 1).

According to the door structure of Patent Literature 1, a strain energy of the outer panel is deduced to be partly converted to heat with the adhesive arranged in the aforementioned manner. This configuration is expected to provide some effects of suppressing the vibration of the outer panel.

However, Patent Literature 1 fails to particularly consider a preferable arrangement of the adhesive to enhance a vibration suppression effect of the outer panel. In other words, the arrangement of the adhesive disclosed in Patent Literature 1 does not always efficiently exert the vibration suppression effect, and hence has room for improvement.

CITATION LIST

Patent Literature

Patent Literature 1: Japanese Unexamined Patent Publication No. 2018-90061

SUMMARY OF INVENTION

The present invention has been made in consideration of the aforementioned circumstances, and has an object to provide a door structure of a vehicle which can enhance a vibration suppression effect of an outer panel by using a damping material and thereby reduce a noise transmitted from a door into a vehicle compartment as much as possible.

A door structure of a vehicle according to the present invention for achieving the object includes: an outer panel; an inner member arranged on an inner side of the outer panel in a vehicle width direction; a rigid member arranged between the inner member and the outer panel; and a vibration suppression member arranged between the outer panel and the rigid member. The outer panel includes a hem section disposed on a periphery thereof and connected to the inner member by swaging. The vibration suppression member includes a damping material located adjacent to the hem section and being in contact with the outer panel and the rigid member.

BRIEF DESCRIPTION OF DRAWINGS

FIG. 3A is an enlarged cross-sectional view of the main portion taken along the line B-B in FIG. 1 and seen in the relevant arrow direction.

FIG. 5 is a graph showing a relation between a transmission loss of the outer panel and a loss coefficient of a damping material.

FIG. 6A corresponding to FIG. 2 shows a first modification of the door structure according to the embodiment.

DESCRIPTION OF EMBODIMENTS

Hereinafter, an embodiment of the present invention will be described with reference to the accompanying drawings.

Figure 1:
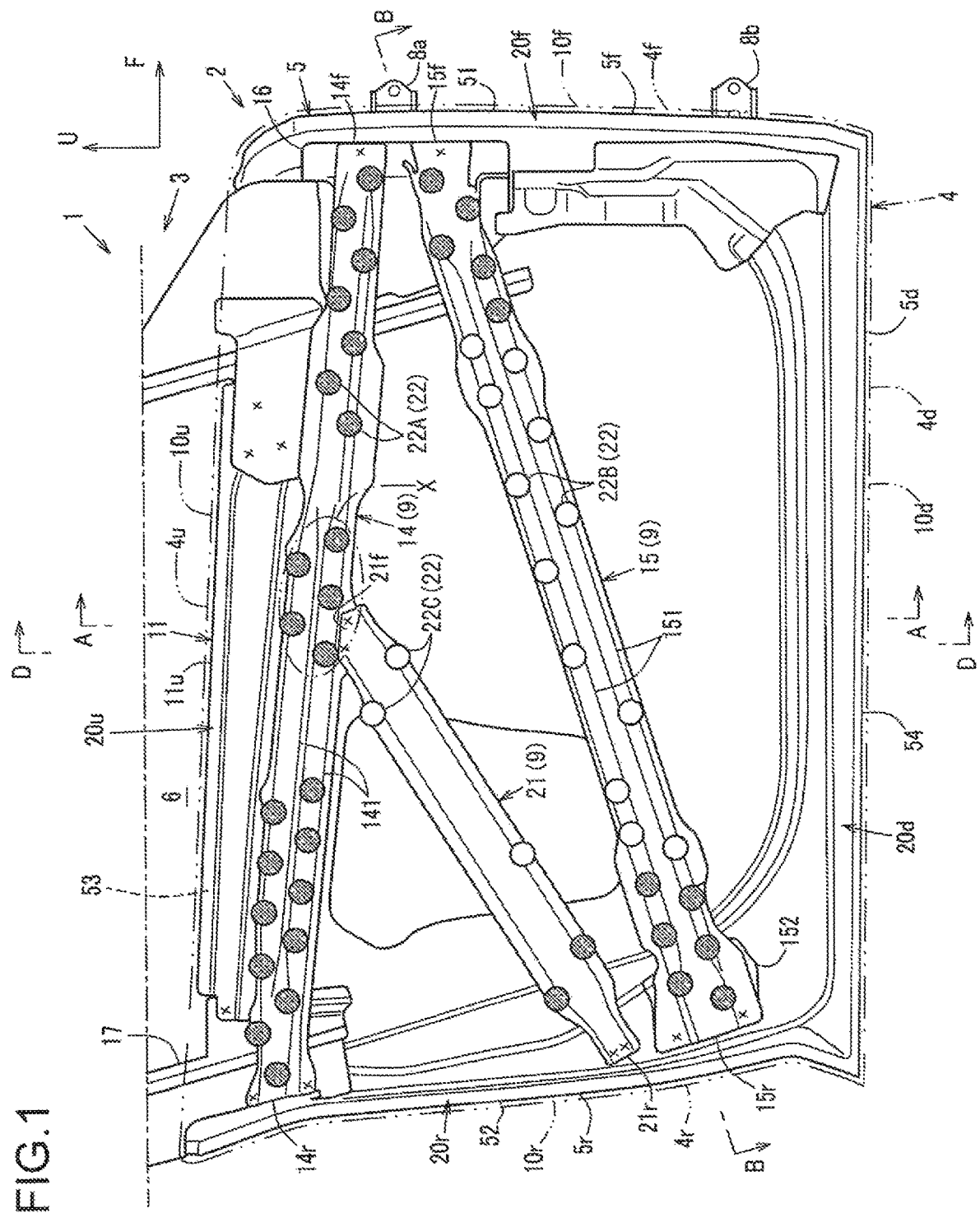
FIG. 1 is a front view of a side door having a door structure of a vehicle according to an embodiment of the present invention with an outer panel being denoted by an imaginary line.
Figure 2:
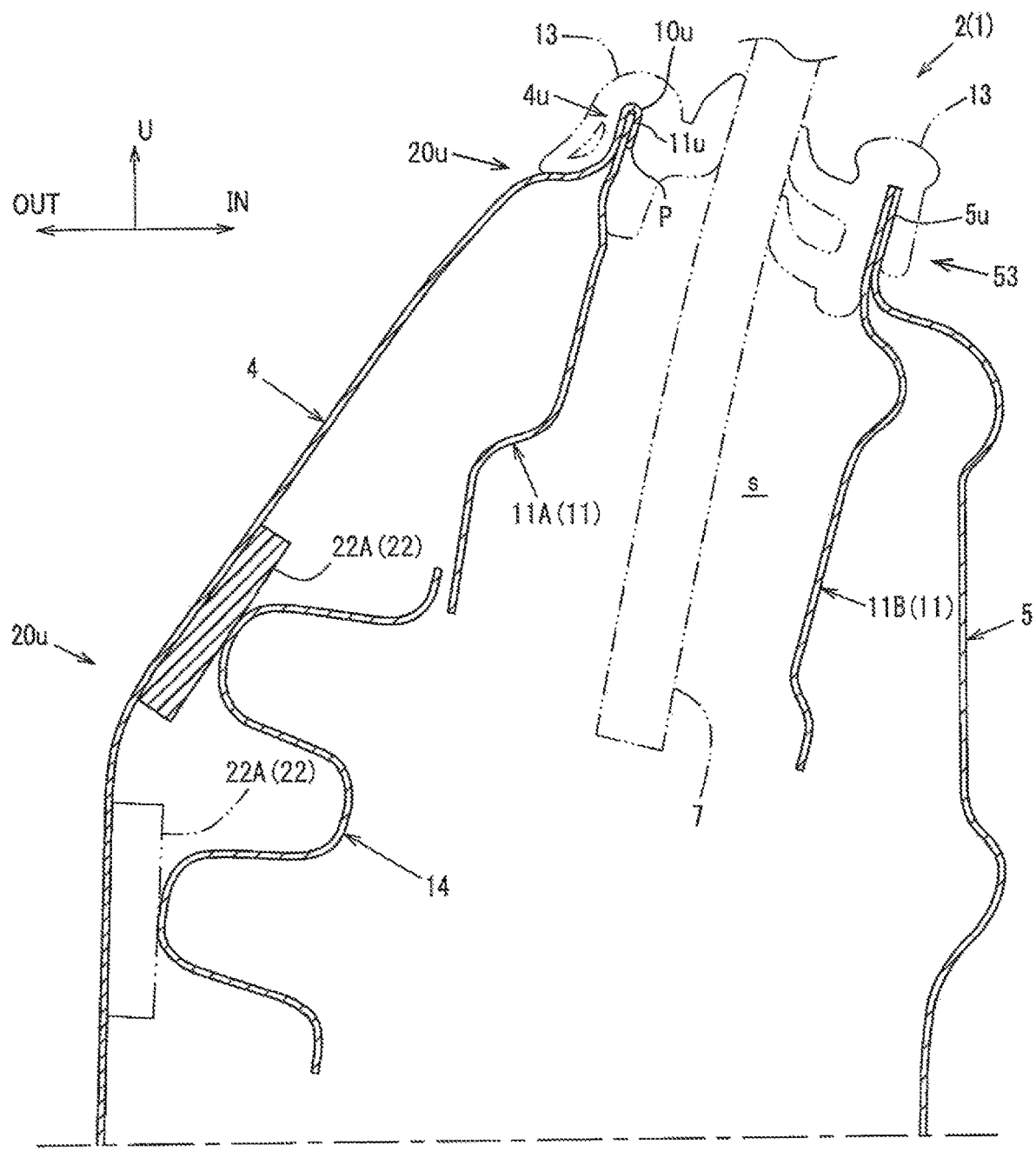
FIG. 2 is an enlarged cross-sectional view of a main portion taken along the line A-A in FIG. 1

FIG. 1 is a front view of a side door 1 of a vehicle adopting a door structure according to the present invention and seen from an outer side in a vehicle width direction. FIG. 2 is an enlarged cross-sectional view of a main portion of the side door 1 taken along the line A-A in FIG. 1. In the drawings, the arrow F denotes a front-direction of the vehicle, the arrow U denotes an up-direction of the vehicle, the arrow OUT denotes an outer side in the vehicle width direction, and the arrow IN denotes an inner side (vehicle compartment side) in the vehicle direction. Furthermore, the sign "x" in FIG. 1 denotes each jointed point where members are joined to each other.

The side door 1 covers a door opening defined on a lateral surface of a vehicle compartment (lateral side of a seat) in an openable and closable manner. As shown in FIG. 1, the side door 1 includes a door main body 2 and a door sash 3 provided on the door main body 2.

As shown in FIGS. 1 and 2, the door main body 2 includes an outer panel 4 located on the outer side in the vehicle width direction and an inner panel 5 located in the inner side in the vehicle direction. The outer panel 4 is denoted by an imaginary line (long dashed double-dotted line) in FIG. 1 for convenience.

The door sash 3 defines a window opening 6 (FIG. 1) in cooperation with an upper edge of the door main body 2. The door main body 2 supports a window glass 7 (FIG. 2) for opening and closing the window opening 6 in a liftable and lowerable manner. The door main body 2 is provided with, in the inside thereof, an unillustrated lifting and lowering device for lifting and lowering the window glass 7.

As shown in FIG. 1, the door main body 2 has a substantially rectangular shape as a whole. Specifically, the door main body 2 has a front-side part 51, a rear-side part 52, a top-side part 53, and a bottom-side part 54. A pair of upper and lower hinge brackets 8a, 8b are attached to the front-side part 51 of the door main body 2.

FIG. 3A is an enlarged cross-sectional view of the main portion of the side door 1 taken along the line B-B in FIG. 1 and seen in the relevant arrow direction. As shown in FIG. 3A and the preceding FIG. 1, the outer panel 4 and the inner panel 5 are connected to each other by swaging at the front-side part 51, the rear-side part 52, and the bottom-side part 54 of the door main body 2. Specifically, a front end 4f of the outer panel 4 and a front end 5f of the inner panel 5 are connected to each other by swaging, a rear end 4r of the outer panel 4 and a rear end 5r of the inner panel 5 are connected to each other by swaging, and a lower end 4d of the outer panel 4 and a lower end 5d of the inner panel 5 are connected to each other by swaging.

More specifically, the rear end 4r of the outer panel 4 has a rear end hem part 10r bent by way of hemming processing as particularly shown in FIG. 3A. The rear end hem part 10r is processed to enclose the rear end 5r of the inner panel 5 to thereby connect the rear end 4r of the outer panel 4 and the rear end 5r of the inner panel 5 to each other. Similarly, the front end 4f and the lower end 4d of the outer panel 4 respectively has a front end hem part 10f and a lower end hem part 10d each bent by way of hemming processing. The front end hem part 10f and the lower end hem part 10d are processed to respectively enclose the front end 5f and the lower end 5d of the inner panel 5. In this way, the front end 4f of the outer panel 4 and the front end 5f of the inner panel 5 are connected to each other, and the lower end 4d of the outer panel 4 and the lower end 5d of the inner panel 5 are connected to each other. FIG. 3A illustrates only the lower end hem part 10d and the rear end hem part 10r, but it should be noted that the front end hem part 10f has the same shape.

As shown in FIGS. 1 and 2, the door main body 2 is provided with a reinforcement member 11 extending in the front-rear direction in the inside of the top-side part 53, specifically, between an upper end 4u of the outer panel 4 and an upper end 5u of the inner panel 5.

The reinforcement member 11 reinforces the top-side part 53 (belt line) of the door main body 2, and has an outer belt panel 11A and an inner belt panel 11B (see FIG. 2). The two panels 11A, 11B are spaced from each other in the vehicle width direction. The outer belt panel 11A is arranged on the outer side of the inner belt panel 11B in the vehicle width direction. The outer belt panel 11A corresponds to an "upper end reinforcement panel" defined in the claims.

The outer belt panel 11A and the inner belt panel 11B define a gap S therebetween for allowing the window glass 7 to slide out or into the door main body 2 when the window glass 7 is lifted or lowered. As denoted by the imaginary line in FIG. 2, the top-side part 53 of the door main body 2 is engaged with a weather strip 13 for sealing the gap S.

As shown in FIG. 2, the upper end 4u of the outer panel 4 and an upper end 11u of the outer belt panel 11A are connected to each other by swaging at the top-side part 53 of the door main body 2. Specifically, the upper end 4u of the outer panel 4 has an upper end hem part 10u bent by way of hemming processing. The upper end hem part 10u is processed to enclose the upper end 11u of the outer belt panel 11A to thereby connect the upper end 4u of the outer panel 4 and the upper end 11u of the outer belt panel 11A to each other. In this respect, the connection by swaging at the top-side part 53 of the door main body 2 differs from the connection by swaging at the remaining parts (the front-side part 51, the rear-side part 52, and the bottom-side part 54) of the door main body 2 in that the outer panel 4 and the inner panel 5 are not connected to each other by swaging, but the outer panel 4 and outer belt panel 11A are connected to each other by swaging.

As shown in FIG. 1, the door main body 2 includes a rigid member 9 for enhancing the rigidity thereof. The rigid member 9 includes two impact bars 14, 15, and a single door reinforcement panel 21.

The two impact bars 14, 15 extend from the front-side part 51 to the rear-side part 52 of the door main body 2 in the front-rear direction. The impact bars 14, 15 are spaced from each other in the up-down direction, and the impact bar 14 is located above the impact bar 15. Hereinafter, the impact bar 14 at a higher position is referred to as an upper impact bar 14 and the impact bar 15 at a lower position is referred to as a lower impact bar 15. A combination of the upper impact bar 14 and the lower impact bar 15 corresponds to a "door impact bar" defined in the claims.

As shown in FIG. 1, the upper impact bar 14 has a front flange 14f and a rear flange 14r. The front flange 14f is formed at a front end of the upper impact bar 14, and fixed to the front end 5f of the inner panel 5. The rear flange 14r is formed at a rear end of the upper impact bar 14, and fixed to the rear end 5r of the inner panel 5. In other words, the upper impact bar 14 extends from the front end 5f to the rear end 5r of the inner panel 5 in the front-rear direction. Furthermore, the upper impact bar 14 has a plurality of (here, two) protrusions 141 extending in a longitudinal direction of the upper impact bar 14 and protruding outwardly in the vehicle width direction between the flanges 14f, 14r.

Similarly, the lower impact bar 15 has a front flange 15f and a rear flange 15r. The front flange 15f is formed at a front end of the lower impact bar 15, and fixed to the front end 5f of the inner panel 5. The rear flange 15r is formed at a rear end of the lower impact bar 15, and fixed to the rear end 5r of the inner panel 5. In other words, the lower impact bar 15 extends from the front end 5f to the rear end 5r of the inner panel 5 in the front-rear direction. Furthermore, the lower impact bar 15 has a plurality of (here, two) protrusions 151 extending in a longitudinal direction of the lower impact bar 15 and protruding outwardly in the vehicle width direction between the flanges 15f, 15r.

A hinge reinforcement panel 16 for reinforcing the upper hinge bracket 8a is fixed to an upper portion of the front end 5f of the inner panel 5. Further, a rear sash base 17 serving as a lower end of a rear-side part of the door sash 3 is fixed to an upper portion of the rear end 5r of the inner panel 5. The upper impact bar 14 having the front flange 14f joined to an upper portion of the hinge reinforcement panel 16 is fixed to the upper portion of the front end 5f of the inner panel 5 via the hinge reinforcement panel 16. The upper impact bar 14 having the rear flange 14r joined to the rear sash base 17 is fixed to the rear end 5r of the inner panel 5 via the rear sash base 17.

The upper impact bar 14 linearly extends in such a posture as to be slightly inclined upward to the rear thereof, that is, a posture that the rear end is at a slightly higher position than the front end. The upper impact bar 14 extends along the top-side part 53 (upper edge) of the door main body 2 in substantially parallel to the reinforcement member 11 (outer belt panel 11A thereof). As shown in FIGS. 1 and 2, the upper end of the upper impact bar 14 is at the same height as the lower end of the outer belt panel HA. In other words, the upper impact bar 14 is at such a height position as to partly overlap the outer belt panel 11A in a door front view (vehicle width directional view), more specifically, is at such a height position that the upper end of the upper impact bar 14 covers the lower end of the outer belt panel H A on the outer side in the vehicle width direction.

A region adjacent to the front end hem part 10f in the door main body 2 is defined as a front hem adjacent region 20f. A region adjacent to the rear end hem part 10r in the door main body 2 is defined as a rear hem adjacent region 20r. A region adjacent to the upper end hem part 10u in the door main body 2 is defined as an upper hem adjacent region 20u. A region adjacent to the lower end hem part 10d in the door main body 2 is referred to as a lower hem adjacent region 20d. The upper impact bar 14 is arranged so that the entirety thereof falls within the three hem adjacent regions 20f, 20r, 20u except the lower hem adjacent region 20d. That is to say, the front end of the upper impact bar 14 including the front flange 14f is located in the front hem adjacent region 20f (or the upper hem adjacent region 20u). The rear end of the upper impact bar 14 including the rear flange 14r is located in the rear hem adjacent region 20r (or the upper hem adjacent region 20u). The main portion of the upper impact bar 14 except the front end and the rear end is located in the upper hem adjacent region 20u. The respective hem adjacent regions 20f, 20r, 20u, 20d represent belt-shaped regions each extending along the corresponding hem part (10f, 10r, 10u, 10d) and having a distance of 200 mm or shorter from an inner edge P (FIG. 2, FIG. 3A) of the hem part toward a center of the door main body 2.

As shown in FIG. 1, the lower impact bar 15 having the front flange 15f joined to a lower portion of the hinge reinforcement panel 16 is fixed to the upper portion of the front end 5f of the inner panel 5 via the hinge reinforcement panel 16. The rear flange 15r of the lower impact bar 15 is fixedly joined to a lower portion of the rear end 5r of the inner panel 5. In other words, the lower impact bar 15 extends from the front end 5f to the rear end 5r of the inner panel 5 in the front-rear direction.

Figure 3B:
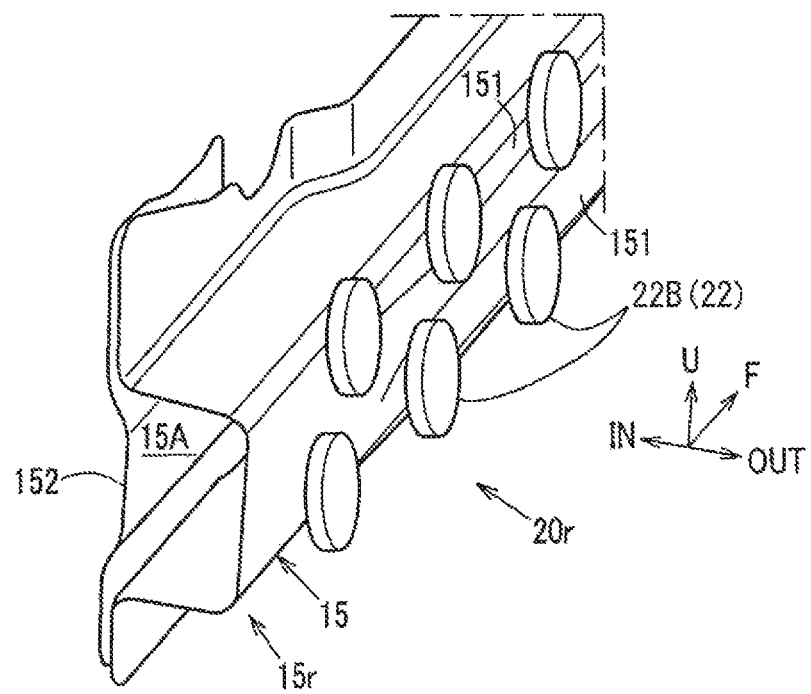
FIG. 3B is a perspective view showing an enlarged rear end of a lower impact bar.

FIG. 3B is a perspective view showing the enlarged rear end of the lower impact bar 15. As shown in this figure, the rear flange 15r of the lower impact bar 15 has such a hat-shape in a cross-section as to protrude outwardly in the vehicle width direction. A reinforcement plate 152 having a flat shape is joined to the lower impact bar 15 on the inner side of the rear flange 15r in the vehicle direction. The rear flange 15r and the reinforcement plate 152 accordingly define an closed cross section 15A (closed cross-sectional space) therebetween. As shown in FIGS. 1 and 3A, the rear flange 15r is joined to the lower portion of the rear end 5r of the inner panel 5 together with the reinforcement plate 152.

As shown in FIG. 1, the lower impact bar 15 is arranged so that the front end including the front flange 15f falls within the front hem adjacent region 20f, and the rear end including the rear flange 15r falls within the rear hem adjacent region 20r.

The lower impact bar 15 linearly extends in such a posture as to be inclined downward to the rear thereof, that is, a posture that the rear end is at a lower position than the front end. A distance between the rear end of the upper impact bar 14 and the rear end of the lower impact bar 15 is larger than a distance between the front end of the upper impact bar 14 and the front end of the lower impact bar 15. This configuration provides the operational effect of efficiently receiving an impact load input to the door main body 2 at a side collision of the vehicle.

As shown in FIG. 1, the door reinforcement panel 21 extends from a central portion of the side door 1 including the door main body 2 and the door sash 3 (i.e., a central portion of the top-side part 53 of the door main body 2 in the front-rear direction) to the rear-side part 52 of the door main body 2 in the front-rear direction.

The door reinforcement panel 21 linearly extends in such a posture as to be inclined downward to the rear thereof, that is, a posture that the rear end is at a lower position than the front end. An inclination angle of the door reinforcement panel 21 with respect to a horizontal plane is set to be larger than that of the lower impact bar 15.

The door reinforcement panel 21 has a front flange 21f and a rear flange 21r. The front flange 21f is formed at a front end (upper end) of the door reinforcement panel 21, and fixedly joined to an intermediate portion (around a center in the front-rear direction) of the upper impact bar 14. The rear flange 21r is formed at a rear end (lower end) of the door reinforcement panel 21, and fixedly joined to an intermediate portion of the rear end 5r of the inner panel 5 in the up-down direction (above the position where the rear flange 15r of the lower impact bar 15 is joined to the rear end). In other words, the door reinforcement panel 21 extends from the intermediate portion of the upper impact bar 14 to the rear end 5r of the inner panel 5 in the front-rear direction (up-down direction).

As shown in FIG. 1, the door reinforcement panel 21 is arranged so that the rear end including the rear flange 21r falls within the rear hem adjacent region 20r.

As shown in FIGS. 1 to 3B, the side door 1 in the embodiment includes a vibration suppression member 22 arranged between the above-described rigid member 9 (the impact bars 14, 15, and the door reinforcement panel 21) and the outer panel 4. The vibration suppression member 22 includes a plurality of damping materials 22A, 22B, 22C respectively arranged on the impact bars 14, 15, and the door reinforcement panel 21. Each of the damping materials 22A, 22B, 22C is an adhesive called a mastic sealer and having a viscosity.

The damping materials 22A, 22B, 22C are distributed in the hem adjacent regions 20f, 20r, 20u, and a remaining region (main region including the central portion of the door main body 2) except the hem adjacent regions 20f, 20r, 20u in the door front view (vehicle width directional view). In FIG. 1, the damping materials arranged in the hem adjacent regions 20f, 20r, 20u are colored, and those in the region except the hem adjacent regions 20f, 20r, 20u are colorless. In the embodiment, a mastic sealer of a high-damping type having a loss coefficient (tan δ) set to 0.7 or more is adopted for each of the damping materials (colored damping materials 22A, 22B, 22C) arranged in the hem adjacent regions 20f, 20r, 20u and the damping materials (colorless damping materials 22A, 22B, 22C) arranged in the region except the hem adjacent regions 20f, 20r, 20u.

As shown in FIGS. 1 to 3A, the vibration suppression member 22 (each of the damping materials 22A, 22B, 22C) is arranged to be in pressure contact with each of the rigid member 9 (the impact bars 14, 15, and the door reinforcement panel 21) and the outer panel 4. Specifically, an uncured paste material being raw material of each of the damping materials 22A, 22B, 22C is applied to designated positions of the rigid member 9, and the outer panel 4 is assembled to the inner panel 5 in this state, so that the outer panel 4 and the rigid member 9 sandwich the paste material. Moreover, the paste material is thermally cured in this state to form the damping materials 22A, 22B, 22C each consisting of a viscous elastic body between the rigid member 9 and the outer panel 4. The damping materials 22A are fixedly arranged between the upper impact bar 14 and the outer panel 4 to be in (close) contact with both. The damping materials 22B are fixedly arranged between the lower impact bar 15 and the outer panel 4 to be in (close) contact with both. The damping materials 22C are fixedly arranged between the door reinforcement panel 21 and the outer panel 4 to be in (close) contact with both.

As shown in FIGS. 1 to 3B, the damping materials 22A, 22B, 22C are respectively arrayed in two upper and lower rows in the longitudinal direction of the rigid member 9. Specifically, the damping materials 22A are arrayed along a center line of the upper impact bar 14 inclined upward to the rear thereof and extending in the front-rear direction on an upper side and a lower side across the center line. The damping materials 22B are arrayed along a center line of the lower impact bar 15 inclined downward to the rear thereof and extending in the front-rear direction on an upper side and a lower side across the center line. The damping materials 22C are arrayed along a center line of the door reinforcement panel 21 inclined downward to the rear thereof and extending in the front-rear direction on an upper side and a lower side across the center line.

As shown in FIG. 1, the damping materials 22C are arranged at a plurality of positions including the opposite ends of the door reinforcement panel 21 in the longitudinal direction thereof. The two damping materials 22C (colored ones) at the rear end (lower end) of the door reinforcement panel 21 are arranged in the rear hem adjacent region 20r. The two damping materials 22C at the front end (upper end) of the door reinforcement panel 21 are arranged around the center of the outer panel 4 in the front-rear direction in the door front view. The two damping materials 22C at the front end fulfill the role of improving the panel rigidity of the outer panel 4 made of a thin steel plate in cooperation with the damping materials 22B arranged around the center of the outer panel 4 (the damping materials 22B arranged in a central portion of the lower impact bar 15 in the longitudinal direction thereof).

As shown in FIGS. 1 and 2, the damping materials 22A are staggered in the longitudinal direction of the upper impact bar 14. Similarly, the damping materials 22B are staggered in the longitudinal direction of the lower impact bar 15.

Specifically, the damping materials 22A are arranged in two upper and lower rows in the longitudinal direction of the upper impact bar 14, and the damping materials in the upper row and the damping materials in the lower row are arrayed alternately (in a zigzag manner) in the front-rear direction. Similarly, the damping materials 22B are arranged in two upper and lower rows in the longitudinal direction of the lower impact bar 15, and the damping materials in the upper row and the damping materials in the lower row are arrayed alternately (in a zigzag manner) in the front-rear direction.

The staggered arrangement of the damping materials 22A (22B) aims at maximally increasing an arrangement density (area) of the damping materials 22A (22B) while avoiding an interference between adjacent damping materials 22A (22B).

Here, a pitch (arrangement interval) between the damping materials 22A (22B) in the respective rows on the impact bar 14 (15) is preferably set to a value equivalent to or smaller than a diameter of each of the damping materials 22A (22B). This setting allows a gap between the adjacent damping materials 22A (22B) in the two rows on the impact bar 14 (15) as seen from above or below, that is, a gap between a specific damping material in one of the upper and lower rows and another damping material adjacent thereto in the other row in the front-rear direction, to be as small as possible. Consequently, it is possible to maximally increase the arrangement density (area) of the damping materials 22A (22B) in the front-rear direction.

In the embodiment, the staggered arrangement at the relatively narrow pitch close to the diameter of the damping material 22A (22B) is restricted partly to the damping materials 22A (22B) at the front end and the rear end of the impact bar 14 (15). In other words, a pith between the damping materials 22A (22B) in the intermediate portion of the impact bar 14 (15) in the front-rear direction is larger than a pitch between the damping materials 22A (22B) on the front end and the rear end of the impact bar 14 (15) in the embodiment (see FIG. 1).

More damping materials 22A (22B) are concentratedly arranged at the front end and the rear end of the impact bar 14 (15) than in the intermediate portion thereof in the front-rear direction in the aforementioned manner to make the arrangement density (area) of the damping materials 22A (22B) in the front hem adjacent region 20f and the rear hem adjacent region 20r be larger than that in other regions.

Additionally, as shown in FIG. 1, the damping materials 22A are staggered at least in a central region of the upper impact bar 14, to which the front end (upper end) of the door reinforcement panel 21 is connected (see the region X in FIG. 1), among a region apart from the front end and the rear end of the upper impact bar 14. This arrangement of the damping materials 22A at the portion having an increased rigidity owing to the connection between the upper impact bar 14 and the door reinforcement panel 21 brings an encouraged shear deformation of the damping materials 22A at a vibration of the outer panel 4 to be described later, resulting in providing a high vibration suppression effect.

As described above, the upper impact bar 14 is arranged near the top-side part 53 (upper edge) of the door main body 2 so that the entirety thereof falls within the upper hem adjacent region 20u. Thus, all the damping materials 22A arranged on the upper impact bar 14 fall within the upper hem adjacent region 20u. Moreover, some damping materials 22A at the front end of the upper impact bar 14 fall within the front hem adjacent region 20f, and other damping materials 22A at the rear end of the upper impact bar 14 fall within the rear hem adjacent region 20r.

In contrast, the lower impact bar 15 is arranged so that the front end thereof falls within the front hem adjacent region 20f and the rear end thereof falls within the rear hem adjacent region 20r. In this arrangement, only the damping materials 22B (colored ones) at the front and rear ends among the damping materials 22B on the lower impact bar 15 fall within the hem adjacent regions 20f, 20r. In the embodiment, the five foremost damping materials 22B fall within the front hem adjacent region 20f, and the six rearmost damping materials 22B fall within the rear hem adjacent region 20r.

Figure 4:
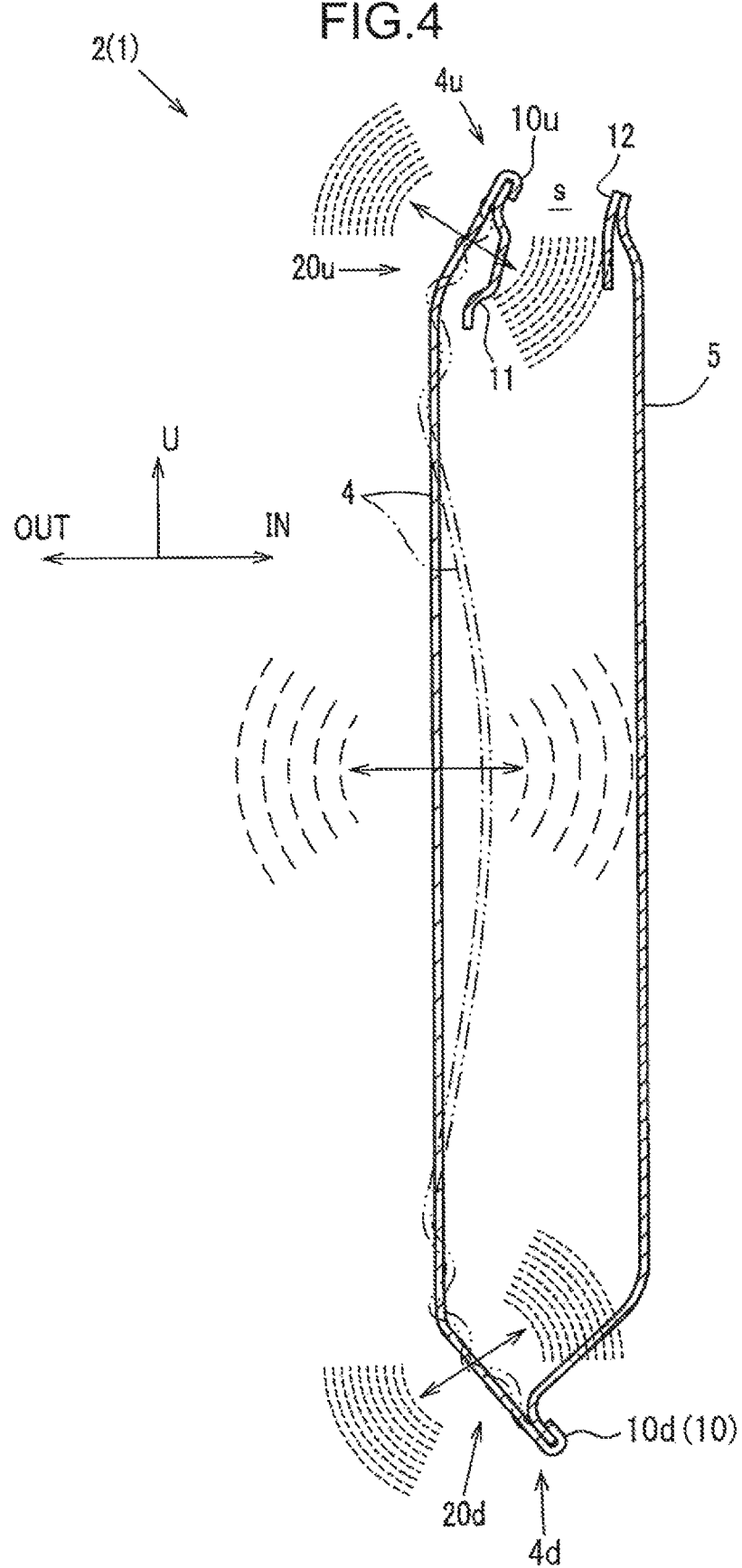
FIG. 4 is an explanatory cross-sectional view of the main portion taken along the line D-D in FIG. 1, and schematically shows the operation in the embodiment.

FIG. 4 is a cross-sectional view of the main portion taken along the line D-D in FIG. 1, and schematically shows the operation of the embodiment. FIG. 4 shows a cross section of the door main body 2 in a state where the vibration suppression member 22 (damping materials 22A to 22C) is removed therefrom without the illustration of the upper and lower impact bars 14, 15.

During running of the vehicle, for instance, an engine sound, a tire sound, or a wind sound transmitted to the side door 1 via an air causes an excitation force to act from the outer side in the vehicle width direction to the outer panel 4 of the door main body 2. The thin outer panel 4 slightly vibrates in response to the excitation force. Similarly, the outer panel 4 slightly vibrates when the side door 1 in an open state is closed as well.

As schematically shown in FIG. 4, when the outer panel 4 slightly vibrates in response to the excitation force from the outer side in the vehicle width direction, an amplitude of the vibration is larger in the central portion of the outer panel 4 than on the periphery of the outer panel 4. In contrast, a frequency of the vibration is lower in the central portion of the outer panel 4 than on the periphery of the outer panel 4.

Specifically, the central portion of the outer panel 4 is away from the hem parts 10f, 10r, 10u, 10d restrained by the connection by swaging, and thus the vibration occurring in the central portion of the outer panel 4 has a large amplitude and a low frequency. In contrast, the vibration occurring on the periphery of the outer panel 4 adjacent to the hem parts 10f, 10r, 10u, 10d (falling within the hem adjacent regions 20f, 20r, 20u, 20d) has a small amplitude and a high frequency. For instance, the slight vibration of the outer panel 4 generates a radiant sound with a low frequency of about 125 Hz or lower from the central portion of the outer panel 4 and a radiant sound with a middle/high frequency exceeding about 125 Hz from the periphery of the outer panel 4.

The difference seen in the frequencies (amplitudes), that is, the relatively higher frequency on the periphery of the outer panel 4 (with the relatively smaller amplitude), means that a strain energy in the hem adjacent regions 20f, 20r, 20u, 20d is larger than a strain energy in the remaining regions other than the hem adjacent regions.

In this respect, the vibration suppression member 22 (each of the damping materials 22A to 22C) is concentratedly arranged in each of the hem adjacent regions 20f, 20r, 20u (see FIG. 1) in the embodiment as described above. This is because the concentrated arrangement of the damping materials 22A to 22C in the hem adjacent regions 20f, 20r, 20u having the relatively large strain energy encourages the shear deformation of the damping materials 22A to 22C interposed between the outer panel 4 and the rigid member 9 (impact bars 14, 15, and the door reinforcement panel 21), resulting in attaining a high vibration suppression effect.

For example, an arrangement of damping materials in the central portion (region other than the hem adjacent regions 20f, 20r, 20u, 20d) of the outer panel 4 causes the damping materials to be displaced integrally with the central portion of the outer panel 4 which vibrates at a relatively large amplitude. Accordingly, the amount of shear deformation of the damping materials is small regardless of the large amplitude. In contrast, another arrangement of the damping materials in the hem adjacent regions 20f, 20r, 20u causes the damping materials to be displaced in an undulation manner relative to the impact bars 14, 15, and door reinforcement panel 21. As a result, large shear deformation of the damping material occurs.

Under the circumstances, a relatively large internal friction occurs in each of the damping materials arranged in the hem adjacent regions 20f, 20r, 20u, and the strain energy is converted to heat. This contributes to suppression of the vibration of the outer panel 4 and eventually to reduction in the radiant sound from the outer panel 4.

In other words, the concentrated arrangement of the damping materials 22A to 22C in the hem adjacent regions 20f, 20r, 20u as in the embodiment can efficiently suppress the vibration of the outer panel 4 caused by the excitation force from the outer side in the vehicle width direction and effectively reduce a noise having a middle/high frequency to enter the vehicle compartment during the running of the vehicle.

FIG. 5 is a graph showing a relation between a transmission loss of the outer panel 4 and a loss coefficient (tan δ) of the damping material when the outer panel 4 of the side door 1 is vibrated as shown in FIG. 4. The plots included in the region R1 in FIG. 5 represent measurement results of a plurality of samples (hereinafter, referred to as "Comparative Example 1") each having a conventional door structure where damping materials having a loss coefficient of 0.2 are concentratedly arranged around the center of the outer panel 4 to improve a panel rigidity of the outer panel 4. The plots included in the region R2 in FIG. 5 represent measurement results of a plurality of different samples (hereinafter, referred to as "Comparative Example 2") each having a conventional door structure where damping materials (mastic sealers of a high-damping type) having a loss coefficient of 0.7 are concentratedly arranged around the center of the outer panel 4. The plots included in the region R3 in FIG. 5 represent measurement results of a plurality of samples (hereinafter, referred to as "Example") each having a door structure according to the embodiment shown in FIG. 1 to FIG. 3B where the damping materials 22A to 22C having a loss coefficient of 0.7 are concentratedly arranged in the hem adjacent regions 20f, 20r, 20u of the outer panel 4.

Comparative Example 2 is common with Comparative Example 1 in the concentrated arrangement of the damping materials around the center of the outer panel 4, but differs therefrom in the larger loss coefficient of the damping materials. Specifically, the loss coefficient in the Comparative Example 2 is set to 0.7 that is larger than the loss coefficient of 0.2 in Comparative Example 1. A panel transmission loss in Comparative Example 2 is larger than that in Comparative Example 1 due to the difference, but a rate of increase in the panel transmission loss is very small (see the respective plots in the regions R1, R2).

In contrast, Example is common with Comparative Example 2 in the damping materials having the loss coefficient of 0.7, but differs from Comparative Example 2 in the regions where the damping materials are concentratedly arranged. Specifically, the damping materials are concentratedly arranged in the hem adjacent regions 20f, 20r, 20u in Example, while the damping materials are concentratedly arranged around the center of the outer panel 4 in Comparative Example 2. The transmission loss in Example is larger than that in Comparative Example 2 due to the difference (see the respective plots in the regions R2, R3). Moreover, a rate of increase in the transmission loss from Comparative Example 2 to Example is higher than that from Comparative Example 1 to Comparative Example 2.

It is seen from these results that the concentrated arrangement of the damping materials around the center of the outer panel 4 is too restrictive to satisfactorily improve the vibration suppression effect even with an increased loss coefficient of the damping materials. In other words, the concentrated arrangement of the damping materials 22A to 22C in the hem adjacent regions 20f, 20r, 20u of the outer panel 4 as in the embodiment is confirmed to be efficient for the vibration suppression.

As described above, the door structure of the vehicle according to the embodiment includes: the outer panel 4; the inner panel 5 and the outer belt panel 11A arranged on the inner side of the outer panel 4 in the vehicle width direction; the rigid member 9 (impact bars 14, 15, and door reinforcement panel 21) arranged between the inner panel 5 and the outer panel 4; and the vibration suppression member 22 arranged between the outer panel 4 and the rigid member 9. The outer panel 4 includes the hem parts 10f, 10r, 10u disposed on the periphery thereof and connected to the inner panel 5 or the outer belt panel 11A by swaging. The vibration suppression member 22 includes the damping materials 22A to 22C sandwiched between the outer panel 4 and the rigid member 9 in contact with both, and some damping materials 22A to 22C (colored ones shown in FIG. 1) are arranged in the hem adjacent regions 20f, 20r, 20u adjacent to the hem parts 10f, 10r, 10u. This configuration can enhance the vibration suppression effect of the outer panel 4 by the damping materials 22A to 22C, and effectively reduce the noise transmitted from the side door 1 into the vehicle compartment.

Specifically, in the embodiment, the arrangement of the damping materials 22A to 22C in the hem adjacent regions 20f, 20r, 20u where the strain energy is likely to be accumulated at the vibration of the outer panel 4 enables the damping materials 22A to 22C to efficiently convert the strain energy to heat.

The strain energy in the hem adjacent regions 20f, 20r, 20u is thus sufficiently absorbed. It is consequently possible to enhance the vibration suppression effect of the outer panel 4 owing to the damping materials 22A to 22C. Thus, a noise (particularly, a noise having a middle/high frequency) transmitted from the side door 1 into the vehicle compartment can be effectively reduced.

In the embodiment, the damping materials 22A, 22B are arranged on the impact bars 14, 15 (door impact bar) extending from the front end 5f to the rear end 5r of the inner panel 5.

The arrangement of the damping materials 22A, 22B on the impact bars 14, 15 each having the high rigidity (i.e., being less likely to deform) can encourage the shear deformation of the damping materials 22A, 22B located between the outer panel 4 and the impact bars 14, 15 at the vibration of the outer panel 4, and hence can sufficiently enhance the vibration suppression effect.

In the embodiment, the outer belt panel 11A is arranged between the upper end of the inner panel 5 and the upper end of the outer panel 4 and extending in the front-rear direction. The upper end hem part 10u of the outer panel 4 is connected to the upper end 11u of the outer belt panel 11A by swaging. The upper impact bar 14 is arranged in the upper hem adjacent region 20u adjacent to the upper end hem part 10u to extend in the front-rear direction. The damping materials 22A are arrayed in the longitudinal direction of the upper impact bar 14 (see FIG. 1 and FIG. 2).

The arrangement of the damping materials 22A on the upper impact bar 14 in the upper hem adjacent region 20u in the aforementioned manner enables the damping materials 22A to sufficiently absorb the strain energy to occur in the upper hem adjacent region 20u at the vibration of the outer panel 4, and effectively suppress the bibation of the outer panel 4.

In the embodiment, the door reinforcement panel 21 extends from the intermediate portion in the front-rear direction of the upper impact bar 14 to the rear end 5r of the inner panel 5. The rear end hem part 10r of the outer panel 4 is connected to the rear end 5r of the inner panel 5 by swaging. A part of the damping materials 22C is located at the rear end of the door reinforcement panel 21 falling within the rear hem adjacent region 20r adjacent to the rear end hem part 10r (see FIG. 1).

The damping materials 22C arranged between the rear end of the door reinforcement panel 21 and the outer panel 4 as well as between the upper and lower impact bars 14, 15 and the outer panel 4 in this manner can sufficiently absorb the strain energy to occur in the rear hem adjacent region 20r at the vibration of the outer panel 4, and effectively suppress the vibration of the outer panel 4.

The damping materials 22A, 22B are staggered in the longitudinal direction of each of the upper and lower impact bars 14, 15 in the embodiment (see FIG. 1).

This configuration can provide the arrangement of many damping materials 22A, 22B with a minimal gap therebetween in the front-rear direction and reliably ensure the vibration suppression effect owing to the damping materials 22A, 22B while guaranteeing the shape and the quality of the damping materials 22A, 22B having been cured.

In other words, this configuration can increase the arrangement density (area) of the damping materials 22A (22B) even in the arrangement of the damping materials 22A (22B) without the interference between the adjacent damping materials 22A (22B) on the impact bar 14 (15). This consequently makes it possible to provide an excellent vibration suppression effect.

In the embodiment, a mastic sealer of a high-damping type having a loss coefficient (tan δ) of 0.7 or more is adopted for each of the damping materials 22A to 22C.

The arrangement of the damping materials 22A to 22C each made of the mastic sealer of the high-damping type in the respective parts of the door main body 2 including the hem adjacent regions 20f, 20r, 20u can notably enhance the vibration suppression effect of the outer panel 4.

Heretofore, the preferable embodiment and the operational effects of the present invention have been described. However, the present invention should not be limited to the embodiment, and may be changed to various modifications without deviating the scope of the present invention. Hereinafter, representative examples of such modification will be described as a first modification and a second modification. In the following description for the first and the second modifications, the same elements as those in the embodiment (FIG. 1 to FIG. 3B) are given with the same reference signs and numerals, and the descriptions of the same elements will be therefore omitted.

FIG. 6A is a cross-sectional view showing a structure of a side door 1A according to the first modification. The side door 1A according to the first modification includes an outer belt panel 11A' having a different shape from the outer belt panel 11A in the embodiment, and a plurality of damping materials 22D between the outer belt panel 11A' and the outer panel 4.

The outer belt panel 11A' has, in its lower portion, a lower extension 111 located adjacent to the outer panel 4 and extending downward along the outer panel 4.

The lower extension 111 has a pair of upper and lower support parts 111a, 111b protruding toward the outer panel 4. The support parts 111a, 111b face the outer panel 4 to define a space therebetween for receiving the damping materials 22D placed therein. Specifically, the damping materials 22D are arranged between the upper support part 111a and the outer panel 4, and between the lower support part 111b and the outer panel 4 in the front-rear direction (arrayed in two upper and lower rows). More specifically, the damping materials 22D are arranged so that the damping materials 22D on the support part 111a in the upper row and the damping materials 22D on the support part 111b in the lower row are alternated (staggered) in the front-rear direction.

In the first modification, the damping materials 22D are arranged on the outer belt panel 11A' located above the upper impact bar 14. This arrangement enables the damping materials 22D to be closer to the upper end hem part 10u of the outer panel 4 and more efficiently absorb the strain energy in the upper hem adjacent region 20u at the vibration of the outer panel 4. That is to say, it is possible to efficiently convert the strain energy in the upper hem adjacent region 20u to heat, and enhance the vibration suppression effect of the outer panel 4.

The damping materials 22D in the first modification may be arranged on the outer belt panel 11A' in place of the damping materials 22A on the upper impact bar 14, or may be arranged on the outer belt panel 11A' in addition to the damping materials 22A on the upper impact bar 14. In other words, the damping materials may be arranged on either the upper impact bar 14 or the outer belt panel 11A', or may be arranged on both the upper impact bar 14 and the outer belt panel H A'.

Figure 6B:
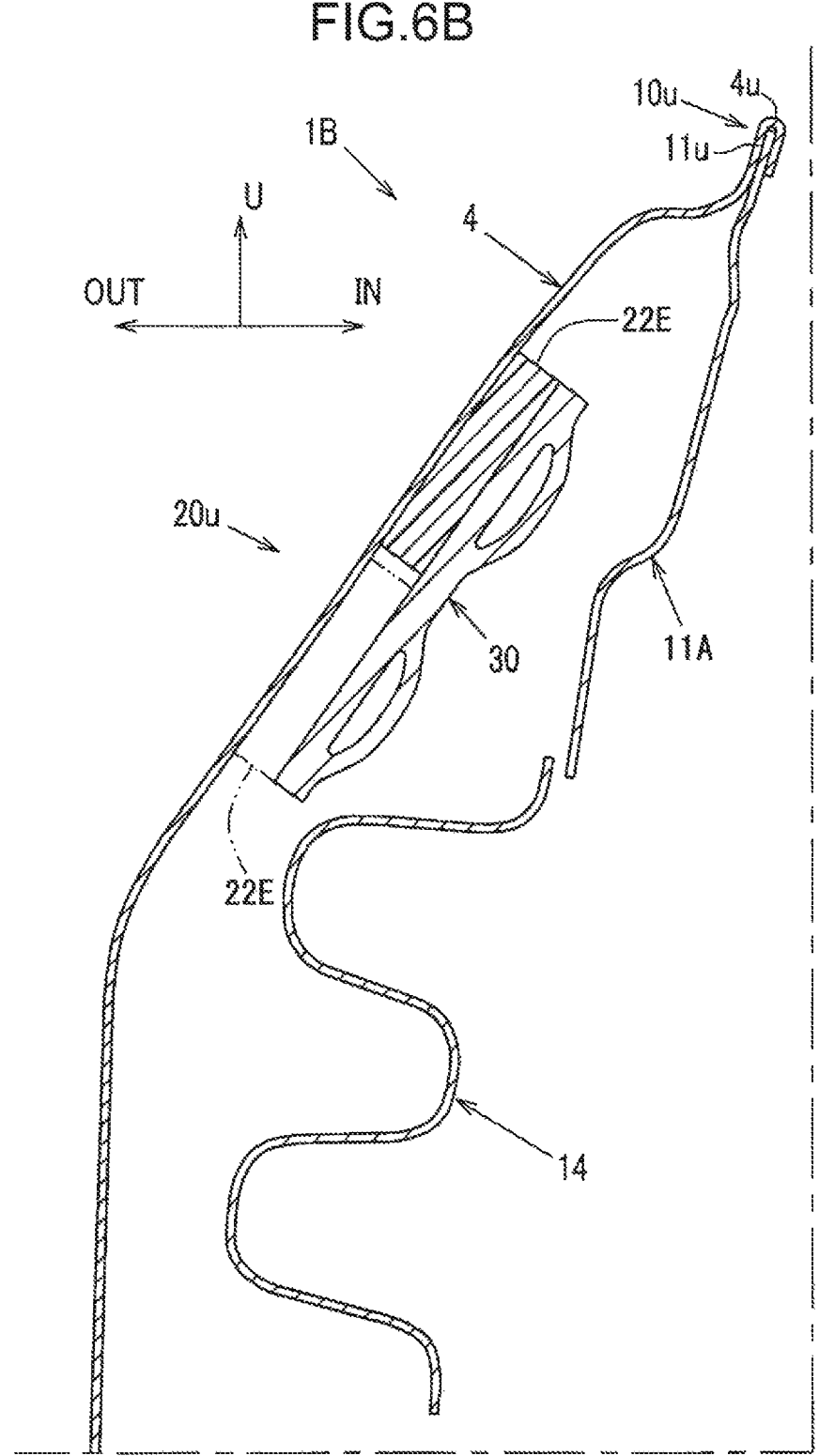
FIG. 6B corresponding to FIG. 2 shows a second modification of the door structure according to the embodiment.

FIG. 6B is a cross-sectional view showing a structure of a side door 1B according to the second modification. The side door 1B according to the second modification includes a rigid member 30 made of aluminum having a thickness which is relatively large in the vehicle width direction (with a relatively large weight).

The rigid member 30 is adhered to the outer panel 4 via a plurality of damping materials 22E without being attached to other door structural component. In other words, the rigid member 30 and the outer panel 4 are integrated via the damping materials 22E to form a three-layered cross-sectional structure in the vehicle width direction.

The damping materials 22E are arrayed in two upper and lower rows in the longitudinal direction (front-rear direction) of the rigid member 30. More specifically, the damping materials 22E are arranged so that the damping materials 22E in the upper row and the damping materials 22E in the lower row are alternated (staggered) in the front-rear direction.

The structure according to the second modification can encourage the shear deformation of the damping materials 22E arranged between the rigid member 30 and the outer panel 4 by using the inertia of the rigid member 30. The damping materials 22E in this arrangement is caused to generate an internal friction to thereby succeed in absorbing the strain energy and further enhancing the vibration suppression effect of the outer panel 4.

The present invention further includes the following modifications.

Although the viscoelastic member made of a mastic sealer and having a relatively large thickness is adopted for each of the damping materials 22A to 22C arranged between the rigid member 9 and the outer panel 4 in the embodiment, a thin sheet-shaped viscoelastic member may be used as the damping material.

Furthermore, although the mastic sealer of the high-damping type having the loss coefficient (tan δ) of 0.7 or more is adopted for each of the damping materials 22A to 22C, the material for the damping material is not limited thereto. For instance, a mastic sealer of a low-damping type having a loss coefficient of less than 0.7 (e.g., about 0.2) may be adopted, or the mastic sealer of the high-damping type and the mastic sealer of the low-damping type may be adopted in combination.

Although the damping materials 22A to 22C are distributed to respective parts of the rigid member 9 (impact bars 14, 15, and the door reinforcement panel 21) so that some of the damping materials 22A to 22C (colored ones in FIG. 1) fall within the front hem adjacent region 20f, the rear hem adjacent region 20r, and the upper hem adjacent region 20u in the embodiment, an additional rigid member may be provided in the lower hem adjacent region 20d, and additional damping materials may be arranged on the additional rigid member.

Summary of Embodiment

The embodiment is summarized in the following manner.

A door structure of a vehicle according to the embodiment includes: an outer panel; an inner member arranged on an inner side of the outer panel in a vehicle width direction; a rigid member arranged between the inner member and the outer panel; and a vibration suppression member arranged between the outer panel and the rigid member. The outer panel includes a hem section disposed on a periphery thereof and connected to the inner member by swaging. The vibration suppression member includes a damping material located adjacent to the hem section and being in contact with the outer panel and the rigid member.

In this configuration, the arrangement of the damping materials in the region adjacent to the hem section where the strain energy is likely to be accumulated at the vibration of the outer panel enables the damping materials to efficiently convert the strain energy to heat.

The strain energy in the region adjacent to the hem section is thus sufficiently absorbed. It is consequently possible to enhance the vibration suppression effect of the outer panel owing to the damping materials. Thus, a noise (particularly, a noise having the middle/high frequency) transmitted from the side door into the vehicle compartment can be effectively reduced.

Preferably, the inner member includes an inner panel, and the rigid member includes a door impact bar extending from a front end to a rear end of the inner panel.

The arrangement of the damping materials on the door impact bar having the high rigidity (i.e., being less likely to deform) can encourage the shear deformation of the damping materials located between the outer panel and the door impact bar at the vibration of the outer panel, and hence can sufficiently enhance the vibration suppression effect.

In the configuration, preferably, the inner member includes the inner panel, and an upper end reinforcement panel arranged between an upper end of the inner panel and an upper end of the outer panel and extending in a front-rear direction, the hem section has an upper end hem part connected to an upper end of the upper end reinforcement panel by swaging, the door impact bar includes an upper impact bar located adjacent to the upper end hem part and extending in the front-rear direction, and the vibration suppression member includes a plurality of the damping materials arrayed in a longitudinal direction of the upper impact bar.

The arrangement of the damping materials on the upper impact bar located adjacent to the upper end hem part enables the damping materials to sufficiently absorb the strain energy to occur in the region adjacent to the upper end hem part at the vibration of the outer panel, and effectively suppress the vibration of the outer panel.

In the configuration, preferably, the rigid member includes the upper impact bar and a door reinforcement panel extending from an intermediate portion of the upper impact bar to the rear end of the inner panel, the hem section has a rear end hem part connected to the rear end of the inner panel by swaging, and the vibration suppression member includes the damping material located adjacent to the rear end hem part at a rear end of the door reinforcement panel.

The damping materials arranged between the rear end of the door reinforcement panel and the outer panel as well as between the upper impact bar and the outer panel can sufficiently absorb the strain energy to occur in the region adjacent to the rear end hem part at the vibration of the outer panel, and effectively suppress the vibration of the outer panel.

Preferably, the vibration suppression member includes a plurality of the damping materials staggered in a longitudinal direction of the rigid member.

This configuration can achieve the arrangement of many damping materials with a minimal gap therebetween and reliably ensure a sufficient vibration suppression effect by the damping materials while facilitating the shaping and quality management of the damping materials sandwiched (compressed) between the rigid member and the outer panel.

In other words, this configuration can increase the arrangement density (area) of the damping materials without an interference between the adjacent damping materials, thereby providing an excellent vibration suppression effect.

Preferably, the damping material includes a mastic sealer of a high-damping type having a loss coefficient (tan δ) of 0.7 or more.

Conclusively, the arrangement of the damping material made of the mastic sealer of the high-damping type in the region adjacent to the hem section can prominently enhance the vibration suppression effect of the outer panel.

The invention claimed is:

1. A door structure of a vehicle, comprising:
an outer panel;
an inner member arranged on an inner side of the outer panel in a vehicle width direction;
a rigid member arranged between the inner member and the outer panel; and
a vibration suppression member arranged between the outer panel and the rigid member, wherein
the outer panel includes a hem section disposed on a periphery thereof and connected to the inner member by swaging, and
the vibration suppression member includes a plurality of damping materials arrayed in two upper and lower rows in a longitudinal direction of the rigid member, and
at least a part of the damping materials is located adjacent to the hem section and in contact with the outer panel and the rigid member.

2. The door structure of a vehicle according to claim 1, wherein
the inner member includes an inner panel, and
the rigid member includes a door impact bar extending from a front end to a rear end of the inner panel.

3. The door structure of a vehicle according to claim 2, wherein
the inner member includes the inner panel, and an upper end reinforcement panel arranged between an upper end of the inner panel and an upper end of the outer panel and extending in a front-rear direction,
the hem section has an upper end hem part connected to an upper end of the upper end reinforcement panel by swaging,
the door impact bar includes an upper impact bar located adjacent to the upper end hem part and extending in the front-rear direction, and the vibration suppression member includes a plurality of the damping materials arrayed in a longitudinal direction of the upper impact bar.

4. The door structure of a vehicle according to claim 3, wherein
the rigid member includes the upper impact bar and a door reinforcement panel extending from an intermediate portion of the upper impact bar to the rear end of the inner panel,
the hem section has a rear end hem part connected to the rear end of the inner panel by swaging, and
the vibration suppression member includes the damping material located adjacent to the rear end hem part at a rear end of the door reinforcement panel.

5. The door structure of a vehicle according to claim 4, wherein
the vibration suppression member includes a plurality of the damping materials staggered in a longitudinal direction of the rigid member.

6. The door structure of a vehicle according to claim 5, wherein
the damping material includes a mastic sealer of a high-damping type having a loss coefficient (tan δ) of 0.7 or more.

7. The door structure of a vehicle according to claim 1, wherein
the vibration suppression member includes a plurality of the damping materials staggered in a longitudinal direction of the rigid member.

8. The door structure of a vehicle according to claim 1, wherein
the damping material includes a mastic sealer of a high-damping type having a loss coefficient (tan δ) of 0.7 or more.

9. The door structure of a vehicle according to claim 2, wherein
the vibration suppression member includes a plurality of the damping materials staggered in a longitudinal direction of the rigid member.

10. The door structure of a vehicle according to claim 2, wherein
the damping material includes a mastic sealer of a high-damping type having a loss coefficient (tan δ) of 0.7 or more.

11. The door structure of a vehicle according to claim 3, wherein
the vibration suppression member includes a plurality of the damping materials staggered in a longitudinal direction of the rigid member.

12. The door structure of a vehicle according to claim 3, wherein
the damping material includes a mastic sealer of a high-damping type having a loss coefficient (tan δ) of 0.7 or more.

13. The door structure of a vehicle according to claim 4, wherein
the damping material includes a mastic sealer of a high-damping type having a loss coefficient (tan δ) of 0.7 or more.

14. The door structure of a vehicle according to claim 7, wherein
the damping material includes a mastic sealer of a high-damping type having a loss coefficient (tan δ) of 0.7 or more.

15. The door structure of a vehicle according to claim 9, wherein the damping material includes a mastic sealer of a high-damping type having a loss coefficient (tan δ) of 0.7 or more.

16. The door structure of a vehicle according to claim 11, wherein the damping material includes a mastic sealer of a high-damping type having a loss coefficient (tan δ) of 0.7 or more.

17. The door structure according to claim 1, wherein the rigid member includes an upper impact bar inclined upward to the rear thereof and extending in a front-rear direction, a lower impact bar inclined downward to the rear thereof and extending in the front-rear direction at a lower position of the upper impact bar, and a door reinforcement panel inclined downward to the rear thereof and extending in the front-rear direction between the upper impact bar and the lower impact bar, the vibration suppression member includes a plurality of first damping materials arranged between the upper impact bar and the outer panel, a plurality of second damping materials arranged between the lower impact bar and the outer panel, and a plurality of third damping materials arranged between the door reinforcement panel and the outer panel, the first damping materials are arrayed along a center line of the upper impact bar on an upper side and a lower side across the center line, the second damping materials are arrayed along a center line of the lower impact bar on an upper side and a lower side across the center line, and the third damping materials are arrayed along a center line of the door reinforcement panel on an upper side and a lower side across the center line.

18. A door structure of a vehicle, comprising:

an outer panel;

an inner panel arranged on an inner side of the outer panel in a vehicle width direction;

a door impact bar arranged between the inner panel and the outer panel, and extending from a front end to a rear end of the inner panel; and a vibration suppression member arranged between the outer panel and the door impact bar, wherein the outer panel includes a hem section disposed on a periphery thereof and connected to the inner panel by swaging, the vibration suppression member includes a plurality of damping materials arrayed in a front-rear direction and in contact with the outer panel and the door impact bar, and a pitch of the damping materials on a front end and a rear end of the impact bar adjacent to the hem section is smaller than a pitch of the damping materials in an intermediate portion of the impact bar in the front-rear direction.

\* \* \* \* \*